Figure 1:
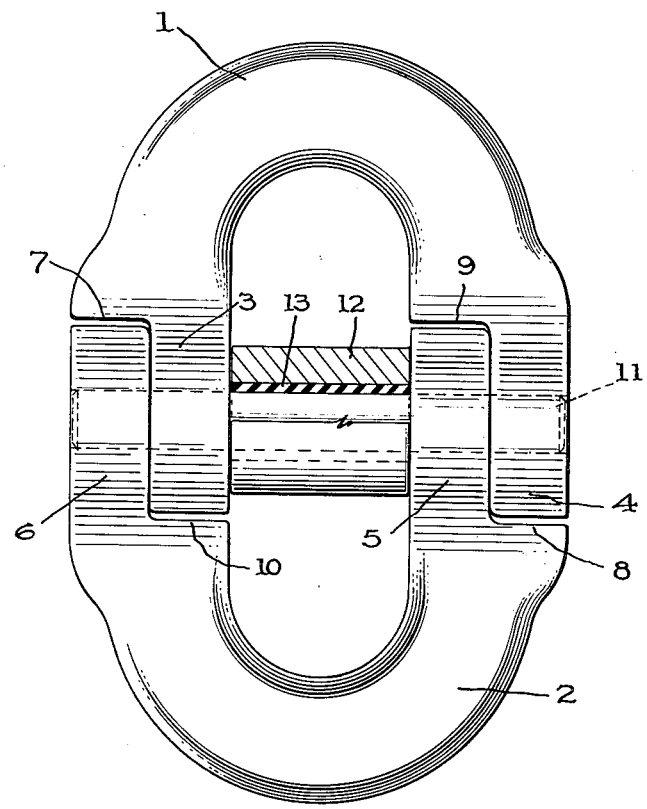

Sept. 24, 1963     W. R. KELTING, JR     3,104,519
                   CHAIN REPAIR LINK
                   Filed April 18, 1961

INVENTOR

WILLIAM R. KELTING, Jr

BY
Cameron, Kerkam + Sutton
ATTORNEYS

United States Patent Office 3,104,519
Patented Sept. 24, 1963

3,104,519
CHAIN REPAIR LINK
William R. Kelting, Jr., Lebanon, N.J., assignor to Harsco Corporation, Harrisburg, Pa., a corporation of Delaware
Filed Apr. 18, 1961, Ser. No. 103,790
1 Claim. (Cl. 59—86)

This invention relates to improvement in chain repair links adapted for use in the field or elsewhere to repair broken drag chains and the like, or to couple lengths of chain together whenever desired.

Obviously when chains are used under working conditions which subject them to severe stress, frequent breakage may result from wear or other damage to a particular link. In such cases it is important to be able to recouple the broken ends of two sections of a chain by means of a repair link, and in other cases such links find utility for example, in assembling short lengths of chain together into one longer piece, etc. As will be understood, the ability to make emergency repairs of this kind quickly and easily in the field or on the job is often of primary importance.

Various types of repair links have been proposed for such purposes, but as far as I am aware, none has been fully satisfactory. In some cases the desired strength has been lacking, the repair link merely providing another weak spot in the chain. In other cases, the method of assembly of the repair link has been such as to require the use of tools and equipment that often are not available in the field. These and other disadvantages of prior repair links are well known to those skilled in this art.

The chief object of the present invention is to provide a repair link which will obviate disadvantages of previous devices of this kind as mentioned above, and one that is not only strong and durable but also can be assembled or disassembled in the field without requiring the use of any equipment except a hammer and drift pin or their equivalents.

One embodiment of the invention has been illustrated in the accompanying drawings, but it is to be understood that said drawing is for purpose of illustration only and is not to be construed as a definition of the limits of the invention, reference being had to the appended claim for this purpose.

Figure 2:
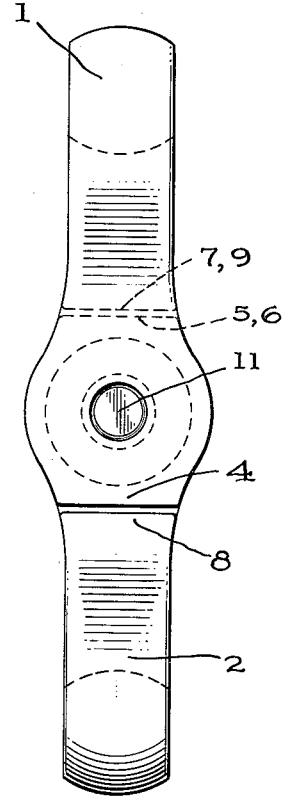

In the drawings,

FIG. 1 is a plan view, partly in section, showing a repair link embodying the invention; and FIG. 2 is a side view of FIG. 1.

Referring to these figures, the repair link comprises a pair of substantially identical, approximately U-shaped half links 1 and 2 which are assembled with their open ends facing one another to provide a more or less oval link, with the end portions of the side legs of these U-shaped members overlapping one another at both sides of the link. FIG. 1 shows a half link 1 with end portions 3 and 4 overlapping similar end portions 5 and 6 of the half link 2. In order to effect this overlap, each leg of each member is preferably reduced in thickness to substantially half, one leg being cut away on its outer side to form an outer shoulder, as in the case of the legs 3 and 5 and their shoulders 7 and 8, and the other leg being cut away on its inner side to provide an inner shoulder as in the case of the legs 4 and 6 and their shoulders 9 and 10.

Accordingly it will be seen that when two such identical half links are to be assembled, they are turned with their open ends toward each other and in such positions that one end portion such as 5 lies inside and is overlapped by another end portion such as 4 of the other half link, while the other end portion 6 lies outside and overlaps the end portion 3 of the other half link.

To assemble the half links and to support the shearing stresses encountered in service, a shear pin 11 is inserted in a plurality of aligned holes in the four overlapping end portions 3, 4, 5 and 6. These holes are preferably of substantially the same inner diameter as the outer diameter of the pin 11 so that it has a close fit therein which holds the parts of the repair link in tight assembly and is better adapted to take the shearing stresses without the wear that would result if a loose fit were provided.

To prevent sidewise movement of one half link relative to the other, which could take place by movement of one or the other half link lengthwise along the pin, the two inner end portions 3 and 5 are separated by a metal retaining sleeve 12 extending between them and having a central bore which is lined with a liner 13 of compressible elastic material such as rubber or the like. The inner diameter of the liner 13, when uncompressed, is at least slightly less than the outer diameter of the pin 11, so that in order to insert the pin in the position shown in the drawing, it must be driven forcibly through the liner 13, meanwhile compressing its rubber like material and being gripped and held thereby against longitudinal movement relative to the half links.

The use of repair links embodying the invention, such as the one described above and shown in the drawings, will now be evident to those skilled in the art. To repair a chain break, for example, the two ends of the chain sections are brought together and one half link is inserted in the end link of each of these sections. The two half links are then brought together in the assembled position shown in the drawing and described above, with the sleeve 12 in position so that the sleeve bore and the holes in the overlapping end portions are all in alignment. It remains only to insert the pin 11 in the holes in one pair of overlapping end portions, driving it in if necessary by means of a hammer or any other equivalent implement that may be handy, after which the pin is driven on through the sleeve liner 12 and through the aligned holes in the other pair of overlapping portions until it finally occupies the position shown in FIG. 1. The central portion of the pin between the sides of the link is now gripped and held tightly against endwise movement by means of the retainer sleeve, and since there is no great stress exerted in the endwise direction, the grip of the rubber-like material is ample to hold the pin securely in place until it is forcibly driven out by means of a hammer and drift pin or the like. The retainer sleeve also acts as a spacer between the two half links so that the whole assembly is tightly secured.

While only one embodiment has been illustrated in the drawings, it will be understood that this embodiment is for purpose of illustration and that various changes may be made without departing from the spirit of the invention. Reference should therefore be had to the appended claim for a definition of the limits of the invention.

What is claimed is:

A repair link for drag chains and the like comprising a pair of substantially identical approximately U-shaped half links of substantially round cross-section with the free end portion of each leg flattened to a thickness of about half that of said round cross-section, one leg being flattened on its outer side and the other on its inner side, whereby two half links with their open ends opposite one another can be moved together with straight line movement to bring said flattened ends into overlapping relation at both sides of the repair link and with a combined thickness substantially equal to that of said cross-section, each flattened end having a hole therethrough and said holes having a common diameter and being brought into alignment transversely of the link when said ends are in overlapping relation, a pin of substantially said diameter extending through said holes with a close fit to connect said half links and a hollow spacer sleeve surrounding said pin and having a length to fit closely between the adjacent inner surfaces of said flattened ends, said sleeve having an inner diameter greater than said pin and a liner of rubber-like material which is compressed when said sleeve is placed over said pin so as to hold said pin against lengthwise movement.

References Cited in the file of this patent

UNITED STATES PATENTS

| | | |
|---|---|---|
| 776,969 | Voigt | Dec. 6, 1904 |
| 1,463,657 | Nelson | July 21, 1923 |
| 1,498,070 | Beucke | June 17, 1924 |
| 2,837,890 | Morrill | June 10, 1958 |
| 2,972,223 | Devonshire et al. | Feb. 21, 1961 |